3,780,119
PROCESS FOR CATALYTIC INTRA-MOLECULAR REARRANGEMENT OF DIMETHYL NAPHTHALENE
Keizo Shimada, Takeo Nishikawa, Toshiaki Harada, and Shizuo Nagahama, Tokyo, Japan, assignors to Teijin Limited, Osaka, Japan
No Drawing. Filed May 31, 1972, Ser. No. 258,405
Int. Cl. C07c 5/24
U.S. Cl. 260—668 A        4 Claims

ABSTRACT OF THE DISCLOSURE

Isomers of dimethyl naphthalene are produced in high yields by catalytic intra-molecular rearrangement at above 260° C. using a specific mordenite catalyst containing a metal form of mordenite, the metal being selected from Li, Na, K, Mg, Ca, Sr, Ba, Zn and Al, and being in an amount above 20% by weight. The above dimethyl naphthalene is selected from 1,5 - dimethylnaphthalene, 1,6-dimethyl naphthalene, 2,6-dimethyl naphthalene and mixtures thereof.

---

The present invention relates to a process for the catalytic intra-molecular rearrangement of dimethyl naphthalene, which comprises the selective intra-molecular rearrangement of a dimethyl naphthalene selected from the group consisting of 1,5-dimethyl naphthalene, 1,6-dimethyl naphthalene, 2,6-dimethyl naphthalene, mixtures thereof (which means mixtures of these two or three types) and mixtures containing these as a main component (which means mixtures containing a major amount of one or more of the above three types of isomers with less than about 5% of other methyl naphthalenes, such as for instance monomethyl naphthalene, trimethyl naphthalene and dimethyl naphthalenes other than the aforesaid), whereby the desired isomer or isomers among the aforesaid three types of dimethyl naphthalenes can be produced in high yields.

Ten isomers of dimethyl naphthalene are known. According to the present invention the desired 2,6-, 1,5- or 1,6- isomer or mixture thereof is selectively obtained by intra-molecular rearrangement. 2,6-dimethyl naphthalene is capable of being easily converted by oxidation to 2,6-naphthalene dicarboxylic acid, which becomes a raw material for the production of polyesters useful as fibers, films and so on; 1,5-dimethyl naphthalene and 1,6-dimethyl naphthalene are useful in the production of unsaturated polyesters or the like. That is, the present invention concerns the process for selective intra-molecular rearrangement of dimethyl naphthalene, including the migration of methyl group between $\alpha \rightleftarrows \beta$ and $\alpha' \rightleftarrows \beta'$ shown in the following formula:

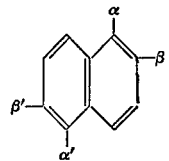

As a process for the production of dimethyl naphthalenes, a process has been heretofore known for the production of 2,3-; 2,6- and 2,7-dimethyl naphthalenes by rearranging the component containing alkyl naphthalenes with a boiling point in the range of 400 to 550° F. using a silica-alumina catalyst (refer to U.S. Pat. 3,235,615).

However, this process causes side-reactions such as demethylation and its isomerization selectivity is poor, bringing on markedly lower isomerization yields.

British Pat. No. 1,039,246 discloses a process for the catalytic intra- and/or inter-molecular rearrangement of alkyl groups present in alkylaromatic hydrocarbons, which comprises contacting a $C_7$-$C_{15}$ alkyl aromatic hydrocarbon with hydrogen mordenite at a temperature between 200 and 600° C. Synthetic mordenite commercially available has heretofore been in the form of a metal such as sodium, and it has been generally believed that an alkali metal and alkaline earth metal form of mordenite, such as calcium form of mordenite, would not show a practical catalytic activity for the rearrangement reaction of alkyl aromatic hydrocarbons. (The Journal of Catalysis, 13, 323 (1969).)

The same holds true for the aforesaid British Pat. No. 1,039,246. For instance, it is proposed therein that a sodium form of mordenite commercially available as "Zeolon" from the Norton Company (U.S.A.) should be converted to the hydrogen form, and the mordenite so formed, in which the hydrogen form accounts for at least 95% by weight, should be used.

Furthermore, in this patent, there are examples indicating that a metal selected from the Groups I–B, VI–B and the iron group metals of Group VIII can be added to the mordenite catalyst by ion-exchange or impregnation methods, in an amount of from 0.01 to 20% by weight, and specifically, that a maximum of 5% by weight of Ag and maximum 3% by weight of Ni were incorporated into hydrogen mordenite. Furthermore, in this patent there is no concrete description with regard to the catalytic rearrangement reaction of dimethyl naphthalenes.

According to the present invention, it has been found that, contrary to the aforesaid prior common opinion and practice, the mordenite catalyst, in which the metal form of mordenite exceeds 20% by weight, shows excellent selectivity in the catalytic intra-molecular rearrangement reaction of the aforesaid dimethyl naphthalenes. It has been discovered that the metal form of mordenite, the metal, in particular, being selected from the group consisting of Li, Na, K, Mg, Ca, Sr, Ba, Zn and Al achieves excellent results.

Furthermore, when the catalytic isomerization reaction of dimethyl naphthalenes, which are treated by the present invention, is carried out by the use of the aforesaid hydrogen form of the mordenite catalyst, a demethylation reaction and transalkylation reaction readily take place and other dimethyl naphthalenes than 1,5-, 1,6-, 2,6-dimethyl naphthalene and mono- and trimethyl naphthalenes tend to be easily formed as by-products, thereby pronouncedly lowering the purity of the intended products. For instance, 2,7-dimethyl naphthalene is produced as a by-product, which forms an eutectic mixture with 2,6-dimethyl naphthalene, decreasing the yield of 2,6-dimethyl naphthalene which can be separated. It has been found out that such disadvantages can be favorably prevented or reduced by the use of the aforesaid metal form of mordenite.

Accordingly, an object of the present invention is to provide an improved process for selective catalytic isomerization to the desired dimethyl naphthalene from the 1,5-, 1,6-, 2,6-dimethyl naphthalene system and a mixture in which these dimethyl naphthalenes are major components and other mono-, di-, tri-methyl naphthalenes are minor components.

Many other objects and advantages of the present invention will be made clearer from the following description.

The catalytic isomerization reaction of the present invention is a three-component system of 1,5-dimethyl naphthalene (which may also be called 1,5-DMN), 1,6-dimethyl naphthalene (which may also be called 1,6-

DMN) and 2,6-dimethyl naphthalene (which may also be called 2,6-DMN), and its selective intra-molecular rearrangement reaction can be expressed by the following formula, that is:

1,5-DMN  1,6-DMN  2,6-DMN

It is noticed from the above formula that, for instance, 1,6-DMN can be rearranged directly to 1,5-DMN and 2,6-DMN, whereas both the rearrangement of 1,5-DMN to 2,6-DMN and of 2,6-DMN to 1,5-DMN proceed via 1,6-DMN.

According to the present invention, dimethyl naphthalene as the starting material can further contain, in addition to at least one 1,5-DMN, 1,6-DMN and/or 2,6-DMN, one or more other methyl naphthalenes, for instance, mono-, di- except the aforesaid, trimethyl naphthalenes. In this case, these additional methyl naphthalenes are in a minor amount, preferably less than about 5% by weight. Specifically, the presence of trimethyl naphthalene is likely to cause the formation of unfavorable 2,7-dimethyl naphthalene as a by-product which is accumulated in the reaction system to lower the purity of 2,6-DMN. For this reason, a preliminary treatment is preferred for reducing its content down to less than about 5% by weight, preferably to less than 2% by weight by means of distillation or the like prior to the catalytic isomerization reaction.

With regard to the composition of dimethyl naphthalene (which may be also called DMN) as a starting material, it is preferred that it should be suitably selected depending upon the type of DMN to be obtained.

It is preferable to change the composition of the starting material depending upon the type of DMN desired. To obtain 2,6-DMN, for instance, 1,5-DMN, 1,6-DMN or mixtures thereof can be used, and it is also possible to use a three-component mixture also including 2,6-DMN. On such occasions mixtures, having a 2,6-DMN content of not more than the thermodynamic equilibrium concentration can be preferably lsed.

To obtain 1,6-DMN, for instance, not only 1,5-DMN, 2,6-DMN or mixtures thereof but also three-component mixtures also including 1,6-DMN can be employed. When using such mixture, those having a 1,6-DMN content of less than the thermodynamic equilibrium concentration can be preferably utilized. This is also true of the case of obtaining 1,5-DMN.

The starting material DMN can be synthesized by any known process. For instance, it is possible to obtain 1,5-DMN by the process of the U.S. Pat. No. 3,244,758. In like manner, 1,6-DMN can be obtained from meta-xylene. It is still further possible to obtain 1,6-DMN by the condensation of toluene and succinic acid, methylation and dehydrogenation. In addition, as starting materials mixtures containing 1,5-DMN, 1,6-DMN, 2,6-DMN and the like obtained from petro-chemical industry, or mixtures thereof with 1,5-DMN or 1,6-DMN obtained in the aforesaid synthesis can also be used. In general, the DMN used in the present invention may be that prepared by any known process, if necessary, after being subjected to the above described pre-treatment.

The catalyst used in the present invention is a mordenite catalyst in which the metal form of mordenite of a metal selected from the group consisting of Li, Na, K, Mg, Ca, Sr, Ba, Zn and Al exceeds 20% by weight, preferably more than 40% by weight. In particular, it is preferred that the metal form of mordenite occupies 50% by weight or more. Both synthetic and natural mordenites can be utilized as long as they can meet the aforesaid requirements.

The aforesaid metal form of mordenite used in the present invention, may be one or more metal forms in which the metal form is in excess of 20% by weight. Even mixtures of hydrogen mordenite therewith, in which the metal form of mordenite is in excess of 20% by weight, can also be utilized. The preferred metals may be Li, Na, K, Mg, Ca, Sr, Ba, Zn and Al. Na, Mg, Ca, Zn and Al are more preferred.

The alkali metal form of the mordenite includes the lithium form, potassium form and so on in addition to the sodium form. These may be obtained by substituting lithium ions or potassium ions for sodium ions in the sodium form mordenite. They may be obtained, for instance, by impregnating the sodium form of synthetic modernite with an aqueous solution of a water-soluble lithium salt or potassium salt, such as lithium chloride, potassium chloride, lithium nitrate, potassium nitrate, lithium sulfate, potassium sulfate and so on while stirring for 2 to 48 hours at 50 to 100° C., followed by filtration, with repetition of this operation if necessary, through washing with pure water, followed by drying and calcination. Calcination is preferably carried out at a temperature of 330 to 550° C. during a period of about 2 to 20 hours. Alkaline earth metal form mordenites are for example, magnesium form, calcium form, strontium form, barium form mordenites and the like. It is also possible to preferably use the zinc form and aluminium form. These metal form mordenites as well may be prepared by the same manner as in the case of alkali metal form mordenites. They may be obtained by impregnating sodium form mordenite with an aqueous solution of a water-soluble magnesium salt, calcium salt, strontium salt, barium salt, zinc salt or aluminium salt, such as for instance magnesium chloride, calcium chloride, strontium chloride, barium chloride, zinc chloride, aluminium chloride, magnesium nitrate, calcium nitrate, strontium nitrate, zinc nitrate, aluminum nitrate, aluminum sulfate and so on, while stirring for 2 to 48 hours at 50 to 100° C., followed by filtration, with repetition of this operation if necessary, thorough washing with pure water, drying and calcination. Calcination is preferably carried out at a temperature of 300 to 550° C. during a period of 2 to 20 hours.

Such metal form of mordenites can be obtained at the various substitution ratios depending upon the treatment conditions, but in the present invention, they can be used regardless of any ratio. Furthermore, alkali metal, zinc or aluminium substituted mordenites, in particular, may be used by mixing with a suitable carrier, such as for instance alumina, silica-gel, bentonite active clay, and diatomaceous earth. On this occasion, when it is calcined at 300–550° C., better effects will be obtained. Further, when the metal form mordenite of the present invention is used as a mixture with hydrogen form mordenite, the mixtures containing the metal form mordenite in the amount of 20% or more are used.

As another process for the preparation of metal substituted mordenites used in the present invention, a process comprising carrying out the same treatment as aforesaid with an aqueous solution of a water-soluble ammonium salt, such as ammonium chloride, ammonium sulfate, ammonium nitrate and so on for sodium form mordenite, drying the same to convert it to the ammonia form mordenite, followed by conversion into the metal form mordenite of an alkali metal such as lithium and potassium, alkaline earth metal such as magnesium, calcium, zinc, aluminum and the like according to the same method as mentioned above. It is also possible to treat natural mordenite having small pore diameter with mineral acid, such as hydrochloric acid and sulfuric acid to convert it to the hydrogen form mordenite having a larger pore diameter, followed by applying to it with the same treatment as aforesaid using aqueous ammonia or an aqueous solution of ammonium salt and drying it to convert it to the ammonium form mordenite and thereafter, converting, following the same method as aforesaid, it into the alkali metal form, alkaline earth metal form, and metal form such as zinc, aluminum and so on.

According to the present invention, the catalytic isomerization reaction is carried out at a temperature above 260° C., usually at a temperature in the range of about 260 to 550° C. in the presence of a catalyst in which the metal form of mordenite of a metal selected from the group consisting of Li, Na, K, Mg, Ca, Sr, Ba, Zn and Al is in excess of 20% by weight, preferably more than 40% by weight and more preferably 50% by weight or more.

The reaction temperature may be suitably selected depending upon the composition of the catalyst and other conditions. In the case of the alkali metal form mordenite, for instance, a preferred reaction temperature is 300 to 550° C., whereas in the case of the calcium or barium form mordenite, 300 to 500° C. is preferred for the reaction temperature. In the case of the magnesium, zinc or aluminium form mordenite, it is preferred that the reaction temperature should be 260 to 400° C., whereas in the case of a catalyst comprising these metal type mordenites and carries such as bentonite and containing hydrogen form mordenite in an amount of 20–80% by weight, it is preferred that the reaction temperature should be 260 to 350° C. The feed rate of the starting material can be suitably selected, and a liquid space velocity of 0.1–5.0 v./v./hr., preferably 0.3–3 v./v./hr. is usually employed. The reaction is usually carried out at atmospheric pressure, but if desired it is also possible to employ reduced pressure or superatmospheric pressure. During the reaction, a carrier gas can be used. The carrier gases may be hydrogen, nitrogen or lower hydrocarbons such as methane, ethane, propane or the like. The least amount of carrier gas will suffice for the replacement of the air in a reactor, whereas in the case of using lower amounts, it is possible to select a suitable ratio within the range suited for the respective reaction conditions.

Modification can be made by dissolving DMN in a solvent, such as benzene, toluene, xylene and the like and this is a preferred embodiment in the case of using a DMN isomer which is solid at room temperature.

When, in the present invention, the reaction is carried out for a prolonged period of time, in some cases, carbonaceous substances will deposit on the catalyst as the reaction proceeds, thereby reducing its activity. In such cases, the catalyst can be regenerated by passing air therethrough for its repeated use.

After the completion of the reaction, the catalytic isomerization product obtained is separated by the separating operation, such as distillation, crystallization and so on, and the desired isomer is thereby obtained. As processes for the separation of 2,6-DMN, for instance the following can be mentioned:

(a) A process for the separation and purification of 2,6-DMN by cooling the formed mixture, filtering precipitated crystals, followed by melt recrystallization or recrystallization from a suitable solvent;

(b) A process of adding to the mixture a reagent for the selective formation of a complex with 2,6-DMN, such as for instance m-nitrobenzoic acid, thereby separating the formed complex and decomposing it to separate 2,6-DMN.

Preferable examples of solvents used in this separation and purification are hydrocarbons, such as benzene toluene, o-xylene, m-xylene, ethyl benzene, mixed xylenes, pentane, hexane, heptane, cyclohexane and so on; alcohols such as methanol, ethanol, isopropanol and so on; ketones such as acetone, methyl ethyl ketone; ethers such as diethyl ether, dioxane and so on.

According to the process of the present invention, it is possible to reduce the formation of methyl naphthalenes such as monomethyl naphthalene, trimethyl naphthalene, etc. other than DMN, or DMN other than 1,5-, 1,6- 2,6-DMN, thereby causing the intra-molecular rearrangement among 1,5-, 1,6- and 2,6-DMN isomers with excellent selectivity.

The present invention will be described with reference to the following examples.

EXAMPLES 1–3

25 g. of commercially available synthetic mordenite (Na form) were immersed in 1 l. of water, in which 0.1 mole of calcium nitrate had been dissolved, and boiled for one hour at 100° C. and thereafter, filtered off. This operation was repeated. Subsequent to repetition of boiling it with 3 l. of water and washing, it was washed with water eight times and calcined at 500° C. for 12 hours to obtain a 85% Ca-substituted mordenite. In like manner a 85% Li-substituted mordenite was obtained by use of lithium chloride. A catalytic isomerization reaction was carried out feeding a 12.5 wt. percent toluene solution of 2,6-DMN using these mordenite catalysts. The reaction was carried out under the conditions of 440° C., w./f.=1.0. The results are shown in Table 1.

TABLE 1

| No. | Catalyst | Percent by weight | |
|---|---|---|---|
| | | Conversion | Selectivity to 1,6-DMN and 1,5-DMN |
| Ex. 1 | Na-mordenite (Na-form 100%) | 52.2 | 97.9 |
| Ex. 2 | Ca-mordenite (Ca-form 85%) | 53.0 | 97.6 |
| Ex. 3 | Li-mordenite (Li-form 85%) | 52.3 | 97.9 |

EXAMPLES 4–5

The catalytic isomerization reaction was carried out feeding a 10 wt. percent toluene solution of 1,5-DMN, using the mordenite catalysts shown in Table 2 below, the catalysts being produced following the same procedures as in Examples 1–3. The reaction was conducted under the conditions of 500° C., w./f.=1.0. The results are shown in Table 2.

TABLE 2

| Number | Catalyst | Percent by weight | |
|---|---|---|---|
| | | Conversion | Selectivity to 1,6-DMN and 2,6-DMN |
| Example: | | | |
| 4 | K-mordenite (K-form 85%) | 30.1 | 99.3 |
| 5 | Ba-mordenite (Ba-form 85%) | 58.8 | 98.8 |

EXAMPLE 6 AND COMPARATIVE EXAMPLES 1–4

The catalytic isomerization reaction was carried out feeding a 10% toluene solution of 1,5-DMN using the mordenite catalysts shown in Table 3. The reaction temperature was set as 260° C., w./f.=0.5. The results obtained are shown in Table 3.

TABLE 3

| Number | Catalyst | Percent by weight | |
|---|---|---|---|
| | | Conversion | Selectivity to 1,6-DMN and 2,6-DMN |
| Example 6 | Na-mordenite (Na-form 50%) (H-form 50%). | 88.1 | 97.1 |
| Comparative Ex. 1. | H-mordenite (H-form 100%). | 92.1 | 79.1 |
| Comparative Ex. 2. | H-mordenite (H-form 95%). | 91.8 | 80.2 |
| Comparative Ex. 3. | H-mordenite (containing 5.0 wt. percent for the Ag component). | 82.3 | 82.3 |
| Comparative Ex. 4. | H-mordenite (containing 3.0 wt. percent for the Ni-component). | 83.4 | 83.5 |

EXAMPLE 7

The catalytic isomerization reaction was carried out feeding a 10% toluene solution of 1,5-DMN by use of an Mg-mordenite catalyst (Mg-form 85%). The reaction conditions were set as: Temperature 340° C., w./f.= 0.5. The results obtained were as follows.

Conversion: 86.4% by weight
Selectivity to 1,6-DMN and 2,6-DMN: 99.1% by weight

EXAMPLES 8–9

The catalytic isomerization was carried out at the reaction temperature shown in Table 4 feeding a 10% toluene solution of 2,6-DMN using the mordenite catalysts shown in Table 4. w./f.=0.5. The results obtained are shown in Table 4.

TABLE 4

| Number | Catalyst | Reaction temperature (°C.) | Percent by weight | |
|---|---|---|---|---|
| | | | Conversion | Selectivity to 1,6-DMN and 1,5-DMN |
| Example: | | | | |
| 8 | Zn-mordenite (Zn-form 85%) | 315 | 51.5 | 97.1 |
| 9 | Al-mordenite (Al-form 85%) | 300 | 52.0 | 97.1 |

EXAMPLES 10–13 AND COMPARATIVE EXAMPLES 8–9

The catalytic isomerization reaction was carried out at the reaction temperature of 320° C., w./f.=0.5 feeding a mixed DMN consisting of 60% 1,6-DMN, 32% 1,5-DMN and 8% 2,6-DMN using the catalysts shown in Table 5. Since the equilibrium composition of this reaction is 48% 2,6-DMN, 43% 1,6-DMN and 9% 1,5-DMN, there is an increase in 2,6-DMN alone by the present isomerization treatment and simultaneously therewith 1,6-DMN and 1,5-DMN are decreased. Consequently, if $y$ percent is the ratio of 2,6-DNN based on the total of 1,6-DMN, 1,5-DMN and 2,6-DMN after the completion of the reaction, it will be defined by:

$$\text{Equilibrium attainment ratio percent} = \frac{y-8}{48-8} \times 100$$

The results obtained were shown in Table 5.

In the aforesaid examples: the remaining 15% is Na-form in Ex. 2, 3, 4, 5, 7, 8, 9 and 10.

The remaining 25% is Na-form in Ex. 12.

What we claim is:

1. In the isomerization of dimethyl naphthaline for the catalytic intra-molecular rearrangement of a dimethyl naphthalene component selected from the group consisting of 1,5-dimethyl naphthalene, 1,6-dimethyl naphthalene, 2,6-dimethyl naphthalene, mixtures thereof and mixtures containing said dimethyl naphthalene as the main component in the presence of a mordenite catalyst, the improvement which comprises carrying out the catalytic intra-molecular rearrangement at a temperature above 260° C. in the presence of a mordenite catalyst in which a metal-form of mordenite is in excess of 20% by weight, said metal being selected from the group consisting of Li, Na, K, Mg, Ca, Sr, Ba, Zn and Al.

2. The process of claim 1 wherein said metal-form of mordenite is in an amount of at least 40% by weight.

3. The process of claim 1 wherein the reaction temperature is in the range of 260° C. to 550° C.

4. The process of claim 1 wherein the metal-form mordenite is in an amount of 40% of at least 50% by weight.

TABLE 5

| Number | Catalyst | Percent by weight | | |
|---|---|---|---|---|
| | | Equilibrium attainment ratio | Conversion | Selectivity to 2,6-DMN |
| Example: | | | | |
| 10 | Mg-mordenite (Mg-form 85%) | 85.2 | 34.7 | 97.1 |
| 11 | Mg-mordenite plus bentonite (1:1) | 81.4 | 33.3 | 97.0 |
| 12 | Zn-mordenite (Zn-form 75%) | 92.7 | 38.0 | 96.1 |
| 13 | Al-mordenite plus alumina (7:3) | 90.1 | 37.4 | 96.5 |
| Comparative Example 5 | Silica-alumina | 93.4 | 37.2 | 66.7 |

References Cited

UNITED STATES PATENTS 3,377,400  4/1968  Wise _____ 260—668 A
3,576,895  4/1971  Wise _____ 260—668 A
3,109,036  10/1963  Suld et al. _____ 260—668 A CURTIS R. DAVIS, Primary Examiner U.S. Cl. X.R.

260—668 F